United States Patent
Oda et al.

(10) Patent No.: US 10,570,016 B2
(45) Date of Patent: Feb. 25, 2020

(54) CARBON NANOTUBE AND PROCESS FOR PRODUCING THE CARBON NANOTUBE, AND LITHIUM ION SECONDARY BATTERY USING THE CARBON NANOTUBE

(71) Applicant: TODA KOGYO CORP., Hiroshima-shi, Hiroshima-ken (JP)

(72) Inventors: Wataru Oda, Otake (JP); Kazushige Kawai, Otake (JP); Tomohiro Honda, Otake (JP); Seiji Okazaki, Otake (JP); Norimichi Nagai, Otake (JP); Tetsuro Toda, Otake (JP)

(73) Assignee: TODA KOGYO CORP., Hiroshma (JP)

( * ) Notice: Subject to any disclaimer, the term of this patent is extended or adjusted under 35 U.S.C. 154(b) by 194 days.

(21) Appl. No.: 15/525,165

(22) PCT Filed: Nov. 12, 2015

(86) PCT No.: PCT/JP2015/081853
§ 371 (c)(1),
(2) Date: May 8, 2017

(87) PCT Pub. No.: WO2016/076393
PCT Pub. Date: May 19, 2016

(65) Prior Publication Data
US 2017/0313586 A1 Nov. 2, 2017

(30) Foreign Application Priority Data
Nov. 14, 2014 (JP) .................. 2014-232247

(51) Int. Cl.
*C01B 32/159* (2017.01)
*B01J 23/745* (2006.01)
(Continued)

(52) U.S. Cl.
CPC ........... *C01B 32/159* (2017.08); *B01J 23/745* (2013.01); *C01B 32/162* (2017.08); *H01M 4/62* (2013.01);
(Continued)

(58) Field of Classification Search
CPC ........ B01J 23/745; H01M 4/62; H01M 4/625; H01M 10/0525; C01B 32/162;
(Continued)

(56) References Cited

U.S. PATENT DOCUMENTS

| | | | |
|---|---|---|---|
| 2009/0136849 A1* | 5/2009 | Yue | ..... H01M 4/1393 429/231.8 |
| 2010/0207053 A1 | 8/2010 | Ryu et al. | |
| 2013/0039839 A1 | 2/2013 | Hocke et al. | |

FOREIGN PATENT DOCUMENTS

| | | |
|---|---|---|
| EP | 2 223 743 | 9/2010 |
| JP | 58-180615 | 10/1983 |

(Continued)

OTHER PUBLICATIONS

Melezhik, et al., Effect of the Matrix Composition on the Activity of Metal Oxide Catalysts in CVD Synthesis of Carbon Nanotubes, Russian Journal of Applied Chemistry 2012; 85(5): 782-787 (Year: 2012).*

(Continued)

*Primary Examiner* — Daniel C. McCracken
(74) *Attorney, Agent, or Firm* — Nixon & Vanderhye P.C.

(57) ABSTRACT

The present invention relates to carbon nanotubes that are excellent in dispersibility and a process for producing the carbon nanotubes. The carbon nanotubes according to the present invention each comprise a wall that comprises a parallel portion and a narrowed portion having a tube outer diameter that is not more than 90% of a tube outer diameter of the parallel portion. Thus, the carbon nanotubes are readily dispersible owing to a high abundance ratio of easily-breaking portions.

8 Claims, 10 Drawing Sheets

(51) Int. Cl.
    *H01M 4/62*     (2006.01)
    *C01B 32/162*   (2017.01)
    *H01M 10/0525*  (2010.01)

(52) U.S. Cl.
    CPC ....... *H01M 4/625* (2013.01); *H01M 10/0525* (2013.01); *C01B 2202/02* (2013.01); *C01B 2202/30* (2013.01); *C01B 2202/36* (2013.01); *C01P 2006/40* (2013.01)

(58) Field of Classification Search
    CPC .............. C01B 32/159; C01B 2202/36; C01B 2202/02; C01B 2202/30; C01P 2006/40
    See application file for complete search history.

(56) References Cited

FOREIGN PATENT DOCUMENTS

| JP | 2003-238126 | 8/2003 |
|----|-------------|--------|
| JP | 2004-276232 | 10/2004 |
| JP | 2006-169072 | 6/2006 |
| JP | 2008-517863 | 5/2008 |
| JP | 2009-155127 | 7/2009 |
| JP | 2010-188337 | 9/2010 |
| JP | 2011-58101  | 3/2011 |
| JP | 2013-519515 | 5/2013 |
| JP | 2014-203804 | 10/2014 |

OTHER PUBLICATIONS

Extended European Search Report issued in Appln. No. 15859876.3 dated Jun. 22, 2018.

Melezhik et al., "Effect of the Matrix Composition on the Activity of Metal Oxide Catalysts in the CVD Synthesis of Carbon Nanotubes" *Russian Journal of Applied Chemistry*, 2012, vol. 85, No. 5, pp. 782-787.

Zhang et al., "The effect of phase separation in the Fe/Mg/Al/O catalysts on the sythesis of DWCNTs from methane" Carbon, 45 (2007) 1645-1650.

International Preliminary Resort on Patentability issued in PCT/JP2015/081853 dated May 16, 2017.

International Search Report for PCT/JP2015/081853, dated Jan. 26, 2016, 4 pages.

* cited by examiner

CARBON NANOTUBE AND PROCESS FOR PRODUCING THE CARBON NANOTUBE, AND LITHIUM ION SECONDARY BATTERY USING THE CARBON NANOTUBE

This application is the U.S. national phase of International Application No. PCT/JP2015/81853 filed 12 Nov. 2015, which designated the U.S. and claims priority to JP Patent Application No. 2014-232247 filed 14 Nov. 2014, the entire contents of each of which are hereby incorporated by reference.

TECHNICAL FIELD

The present invention relates to a carbon nanotube and a process for producing the carbon nanotube.

BACKGROUND ART

With the recent rapid development of portable and cordless electronic equipments such as audio-visual (AV) devices and personal computers, there is an increasing demand for storage battery devices having a small size, a light weight and a high energy density as a power source to drive these electronic devices. Under these circumstances, fibrous materials having a high electrical conductivity have been noticed.

In the aforementioned application fields, there have been conventionally used carbon nanofibers (Patent Literature 1). However, the carbon nanofibers may fail to exhibit sufficient properties for storage battery devices that have been recently required to have a reduced size and a high capacity, although they having a large fiber diameter have good dispersibility in the form of a powder. In consequence, carbon nanotubes having a high electrical conductivity and a much smaller fiber diameter have been noticed. The carbon nanotubes have very excellent properties such as high strength, high electrical conductivity, high thermal conductivity, heat resistance and electromagnetic wave absorption, and therefore researches for practical utilization of the carbon nanotubes in the applications such as composite materials, semiconductor devices and conductive materials have now proceeded.

However, in order to utilize the properties of the carbon nanotubes to a maximum extent, it is necessary to loosen largely entangled aggregates of the carbon nanotubes. For this reason, the use of the carbon nanotubes in the form of a dispersion thereof has now been considered. However, it is generally known that the carbon nanotubes are hardly dispersed in a liquid. At present, there are many literatures that describe attempts for dispersing the carbon nanotubes in a liquid and forming an ink comprising the carbon nanotubes by various methods. In the Patent Literatures 2 and 3, the dispersion of the carbon nanotubes to which a dispersant is added to disperse the carbon nanotubes therein has been studied. In addition, in the Patent Literature 4, chemical modification of the carbon nanotubes themselves has been studied in order to render the carbon nanotubes easily-dispersible. However, these Patent literatures have failed to provide the carbon nanotubes that are sufficiently excellent in dispersibility and dispersion stability.

Also, dispersibility of the carbon nanotube has been improved by controlling a shape thereof. One difficulty in dispersing the carbon nanotubes in a liquid is responsible for a large length of the carbon nanotubes. Therefore, by shortening the carbon nanotubes by cutting, it is possible to deaggregate a mass of the aggregated carbon nanotubes and allow dispersion of the carbon nanotubes to proceed.

Consequently, there have been developed the carbon nanotubes that have non-continuous crystal portions in the mid of a length thereof, and tend to be cut at the joined portions therebetween. The carbon nanotubes conventionally developed have a cylindrically tubular shape, a fish bone shape (cup-laminated type), a trump shape (platelet), etc. The fish bone-shaped or trump-shaped carbon nanotubes have a lot of the non-continuous crystal portions, but they have a structure in which graphite network planes (graphene) are laminated such that the network C-axis is inclined against or perpendicular to the fiber-axis direction, so that single fibers of the carbon nanotubes tend to be deteriorated in electrical conductivity in the major fiber axis direction thereof. In addition, there have been developed carbon fibers having a cylindrical tubular shape in which several tens of so-called bell-shaped constitutional units are laminated with each other (Patent Literature 5). The carbon fibers described in the Patent Literature 5 have such a structure that the respective graphite network planes are in the form of an aggregate in which the bell-shaped constitutional units each having a closed apex portion and a barrel portion opened at a lower end thereof are laminated with a common center axis in a layer form. And at each of joined portions therebetween, the apex portion is inserted into an open end of the other constitutional unit. These fibers therefore tend to lack easily-breaking properties and tend to be still unsatisfactory in dispersibility.

CITATION LIST

Patent Literature

Patent Literature 1: Japanese Patent Application Laid-open (KOKAI) No. 58-180615 (1983)
Patent Literature 2: Japanese Patent Application Laid-open (KOKAI) No. 2003-238126
Patent Literature 3: Japanese Patent Application Laid-open (KOKAI) No. 2004-276232
Patent Literature 4: Japanese Patent Application Laid-open (KOHYO) No. 2008-517863
Patent Literature 5: Japanese Patent Application Laid-open (KOKAI) No. 2011-58101

SUMMARY OF INVENTION

Technical Problem

The present invention has been accomplished in order to solve problems encountered in the aforementioned background art. An object of the present invention is to provide carbon nanotubes that have good dispersibility and dispersion stability when dispersed in a liquid. And the carbon nanotubes are largely improved in electrical conductivity of a coating film formed by applying a dispersion thereof. Additionally, the carbon nanotube particles are capable of sufficiently exhibiting features inherent to them such as high strength, high electrical conductivity, high thermal conductivity, heat resistance and electromagnetic wave absorption.

Solution to Problem

The above object can be achieved by the following aspects of the present invention.

That is, according to the present invention, there are provided carbon nanotubes each comprising a wall (constricted wall portion) that comprises a parallel portion and a narrowed portion having a tube outer diameter that is not more than 90% of a tube outer diameter of the parallel portion, in which when preparing a 0.1% dispersion of the carbon nanotubes, drying the dispersion on a sample table, photographing the thus dried carbon nanotubes at a magnification of 20,000 times using a transmission electron microscope to obtain a micrograph of the carbon nanotubes, dividing the micrograph into sections each having an area of 100 nm square, and selecting 300 sections each having a carbon nanotube occupied area ratio of 10 to 80%, a proportion of the sections in each of which at least one narrowed portion is present is not less than 60% among the 300 sections (Invention 1).

Also, according to the present invention, there are provided the carbon nanotubes according to the above Invention 1, wherein a geometric mean diameter ($M_D$) of the tube outer diameter (D) of the carbon nanotubes is 5 to 30 nm (Invention 2).

Also, according to the present invention, there are provided the carbon nanotubes according to the above Invention 1 or 2, wherein a geometric standard deviation ($\sigma_D$) of distribution of the tube outer diameter of the carbon nanotubes is 1.25 to 1.70 (Invention 3).

Also, according to the present invention, there are provided the carbon nanotubes according to any one of the above Inventions 1 to 3, wherein a product of a ratio of an exothermic peak temperature ($T_{DTA}$) in differential thermal analysis to a crystallite size (Lc(002)) of a (002) plane of the carbon nanotubes in X-ray diffraction analysis, and the geometric standard deviation ($\sigma_D$) of distribution of the tube outer diameter (($T_{DTA}$/Lc(002))×$\sigma_D$) is not more than 22 (Invention 4).

Also, according to the present invention, there are provided the carbon nanotubes according to any one of the above Inventions 1 to 4, wherein a water vapor adsorption of the carbon nanotubes is not less than 0.6 mg/g (Invention 5).

Also, according to the present invention, there are provided the carbon nanotubes according to any one of the above Inventions 1 to 5, wherein a total content of Al and Mg in the carbon nanotubes is 0.5 to 2.0% by weight, and a ratio of a content of Al to a content of Mg in the carbon nanotubes (Al/Mg) is 0.1 to 15.0 (Invention 6).

In addition, according to the present invention, there are provided a process for producing the carbon nanotubes as defined in any one of the above Inventions 1 to 6, in which the carbon nanotubes are produced by chemical vapor deposition reaction using a hydrocarbon gas as a raw material gas, and by using a catalyst comprising at least one element selected from the group consisting of Fe, Co, Ni and Mn, Al and Mg, a production velocity of the carbon nanotubes is controlled to not more than 0.30 g/min per 1 g of the catalyst (Invention 7).

Furthermore, according to the present invention, there are provided a lithium ion secondary battery using the carbon nanotubes as defined in any one of the above Inventions 1 to 6 (Invention 8).

Advantageous Effects of Invention

The carbon nanotubes according to the present invention have a lot of non-continuous crystal portions that can be readily cut by application of a small energy thereto, and therefore are readily dispersed when preparing a dispersion thereof. Thus, when forming a coating film from the dispersion, it is possible to reduce a resistance of the film.

The carbon nanotubes according to the present invention are readily dispersed in the case where they are added as a conductive material for an electrode active material to storage battery devices such as lithium ion secondary batteries. Therefore many conductive paths can be formed therefrom. Thus, it is possible to drastically enhance cycle characteristics of the batteries.

DESCRIPTION OF EMBODIMENTS

The construction of the present invention is described in more detail below.

The carbon nanotubes according to the present invention each comprise a wall that comprises a parallel portion and a narrowed portion having a tube outer diameter that is not more than 90% of a tube outer diameter of the parallel portion. The narrowed portion as defined herein is formed by changing the direction of growth of the carbon nanotubes, so that non-continuous crystal portions are generated at the narrowed portion which therefore provides an easily-breaking portion that is capable of being readily cut by application of a small mechanical energy thereto.

Figure 1:
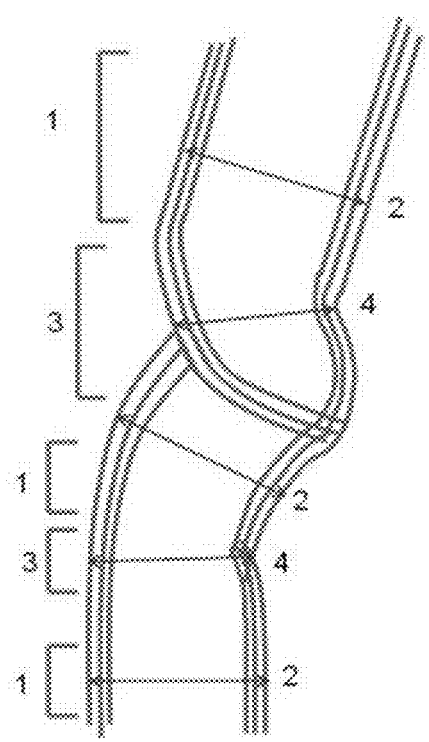
FIG. 1 is a view showing parallel portions and narrowed portions of carbon nanotubes.
Figure 2:
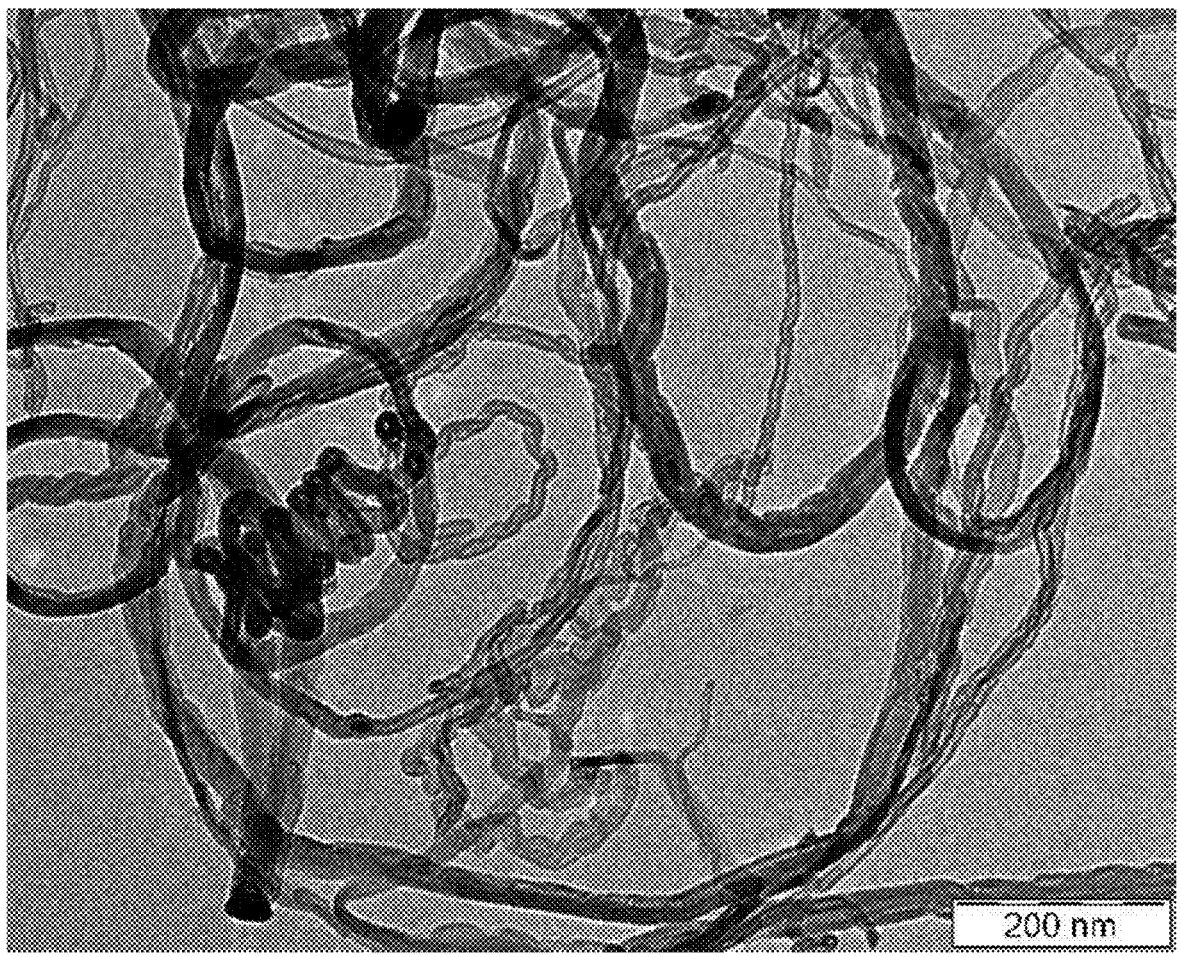
FIG. 2 is a transmission electron micrograph showing carbon nanotubes obtained in Example 1.
Figure 3:
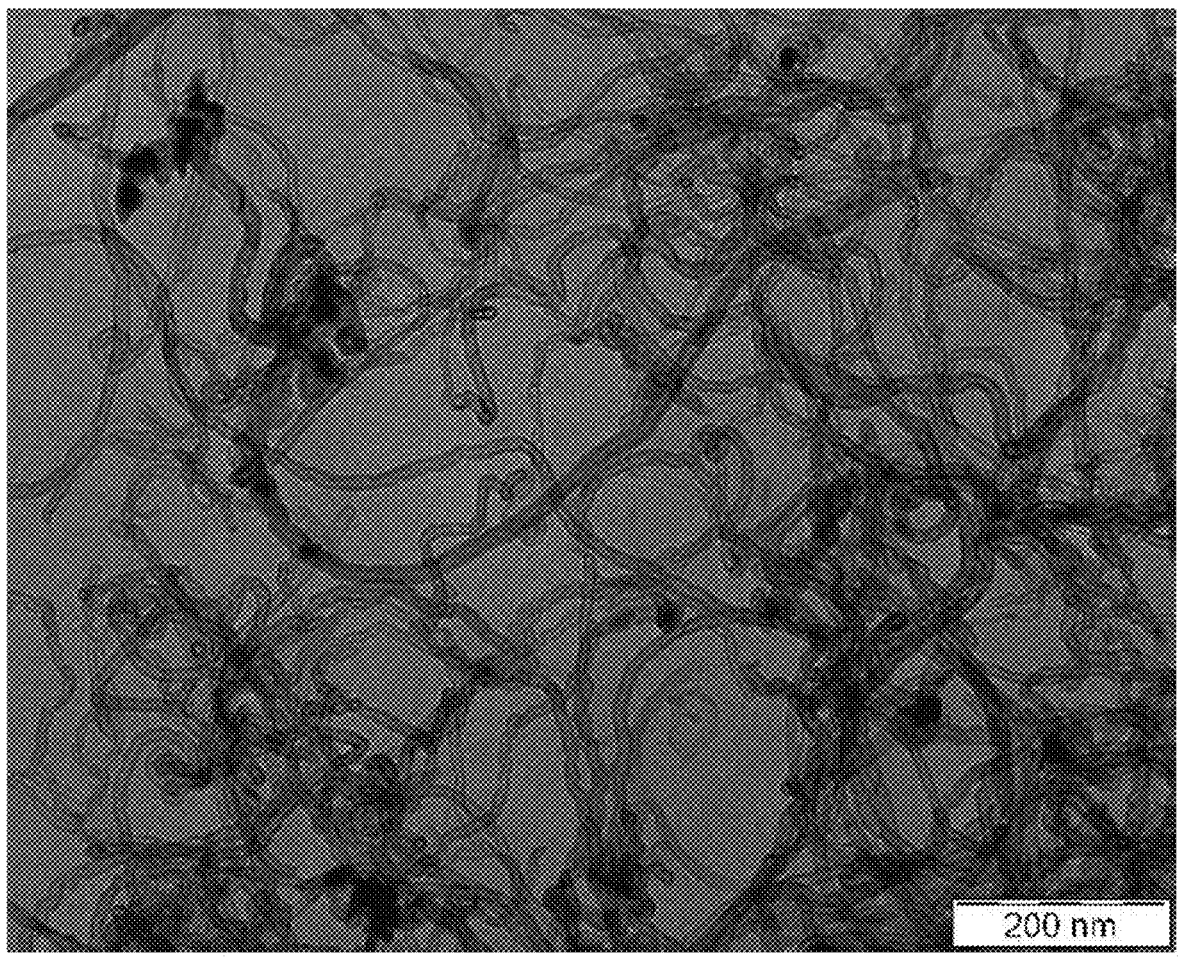
FIG. 3 is a transmission electron micrograph showing carbon nanotubes obtained in Example 4.
Figure 4:
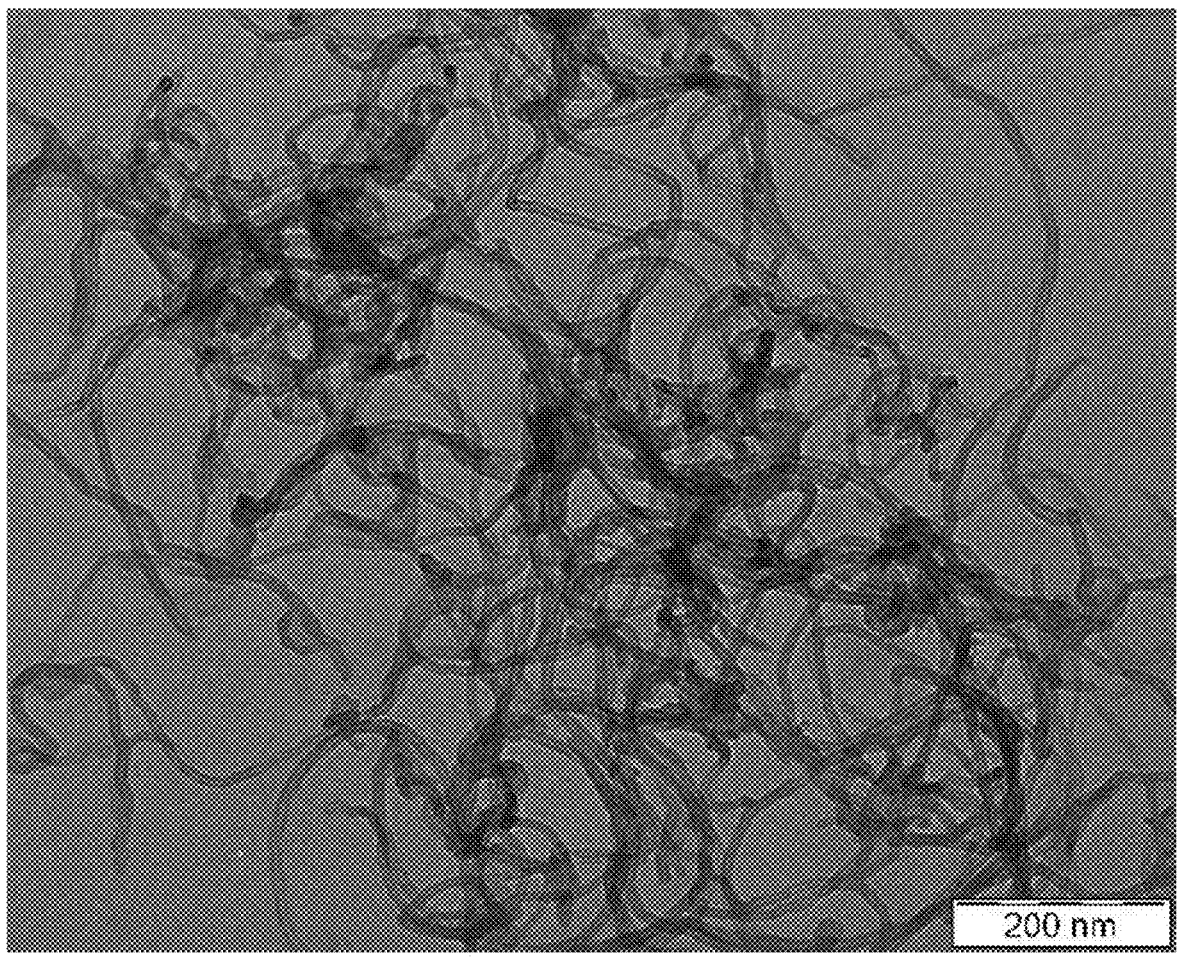
FIG. 4 is a transmission electron micrograph showing carbon nanotubes obtained in Comparative Example 3.
Figure 5:
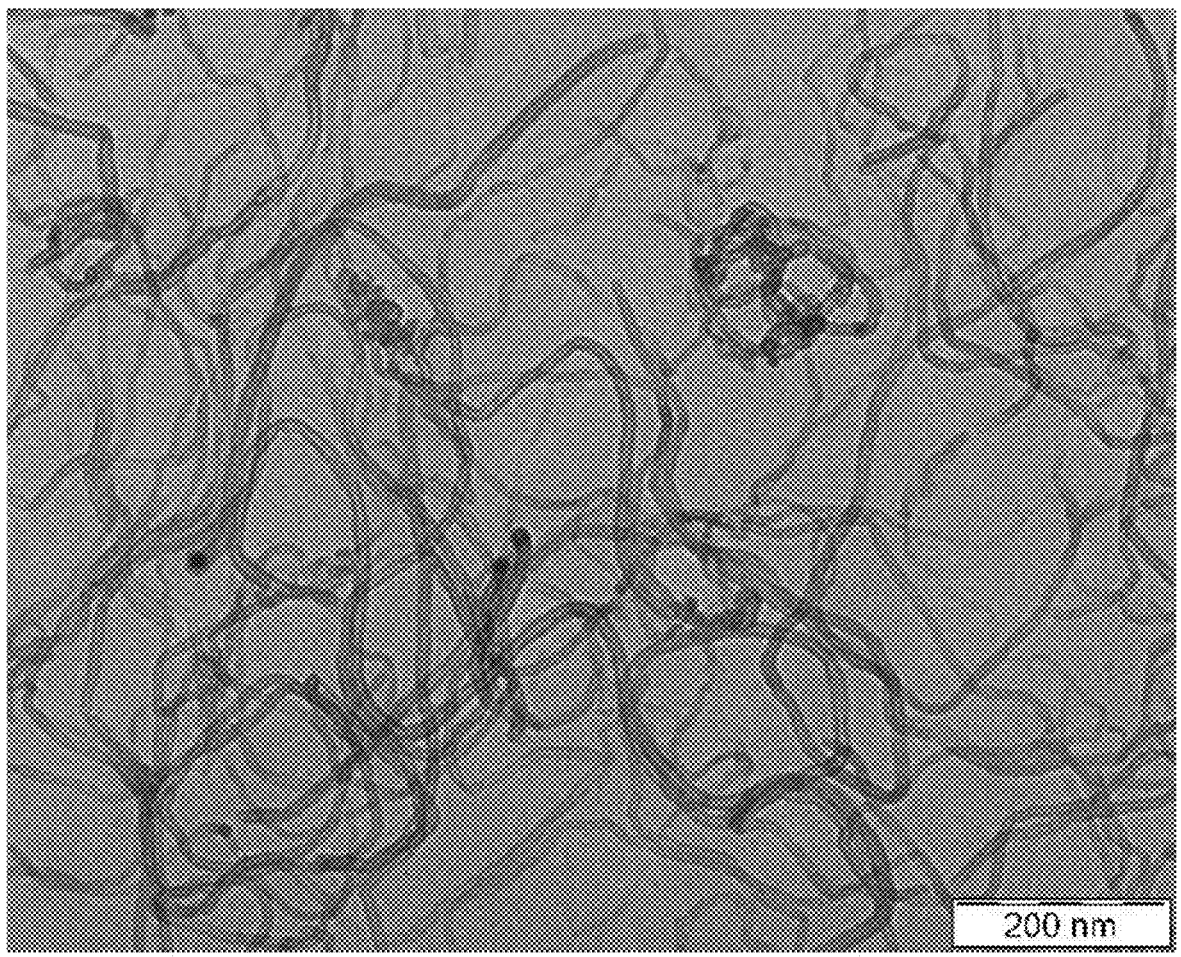
FIG. 5 is a transmission electron micrograph showing carbon nanotubes obtained in Comparative Example 4.

The wall shape and tube outer diameter of the carbon nanotubes can be observed by a transmission electron microscope, etc. The parallel portion of the wall of the respective carbon nanotubes is a portion that can be recognized as two parallel lines or two parallel curves when observed by a transmission electron microscope, i.e., is such a portion as indicated by parallel portion 1 in FIG. 1. The distance between outer walls in the direction normal to the parallel lines is a tube outer diameter 2 of the parallel portion. The narrowed portion of the wall of the respective carbon nanotubes is a portion whose opposite ends are each adjacent to the parallel portion 1 and which has a wall distance that is smaller than that of the parallel portion 1. The narrowed portion also has a tube outer diameter that is not more 90% of the tube outer diameter of the parallel portion. The narrowed portion i.e., is such a portion as indicated by narrowed portion 3 in FIG. 1. The distance between closest wall portions in the wall constituting the outer wall of the narrowed portion is indicated by tube outer diameter 4. Many of the narrowed portions have non-continuous crystal portions as shown in FIG. 1.

In the carbon nanotubes according to the present invention, a ratio of the easily-breaking portions relative to whole portions of the carbon nanotubes is judged as an abundance ratio of the easily-breaking portions by the following proportion. The proportion of sections in each of which at least one narrowed portion is present, among the 300 sections, is determined by preparing a 0.1% dispersion of the carbon nanotubes, drying the dispersion on a sample table, and photographing the thus dried carbon nanotubes at a magnification of 20,000 times. A transmission electron microscope is used to obtain the micrograph of the carbon nanotubes, dividing the micrograph into sections each having an area of 100 nm square, and selecting 300 sections each having a carbon nanotube occupied area ratio of 10 to 80%. When the carbon nanotube occupied area ratio of the respective sections is not more than 10%, the CNT abundance ratio tends to be excessively small and therefore tends to be hardly measurable. On the other hand, when the carbon nanotube occupied area ratio of the respective sections is not less than 80%, the amount of the carbon nanotubes occupying the section tends to be excessively large, so that the carbon nanotubes tend to be overlapped on each other. As a result, the parallel portion tends to be hardly distinguished from the narrowed portion, resulting failing to accurately measure the abundance ratio of the easily-breaking portions. In the present invention, the abundance ratio of the easily-breaking portions in the carbon nanotubes is not less than 60%. When the abundance ratio of the easily-breaking portions is less than 60%, the carbon nanotubes tend to be hardly dispersed. If an excessive mechanical energy is applied to the carbon nanotubes in order to well disperse the carbon nanotubes in the dispersion, there tends to occur breakage of a crystal structure in the graphite network plane, thereby causing deterioration in characteristics such as electrical conductivity as one of features of the carbon nanotubes. In order to attain higher dispersibility of the carbon nanotubes, the abundance ratio of the easily-breaking portions in the carbon nanotubes is preferably not less than 70%.

The geometric mean diameter ($M_D$) of the tube outer diameter of the carbon nanotubes according to the present invention is preferably 5 to 30 nm. When the mean diameter of the tube outer diameter is more than 30 nm, the number of fibers per unit weight of the carbon nanotubes tends to be reduced when used as a conductive material, so that the resulting carbon nanotubes tend to fail to exhibit sufficient electrical conductivity. On the other hand, when the mean diameter of the tube outer diameter is less than 5 nm, it may be difficult to disperse the carbon nanotubes to a sufficient extent, so that the resulting carbon nanotubes tend to be deteriorated in characteristics thereof. In view of good balance between dispersibility and the characteristics, the geometric mean diameter of the tube outer diameter of the carbon nanotubes is more preferably 10 to 25 nm.

The geometric standard deviation ($\sigma_D$) of distribution for the tube outer diameters of the carbon nanotubes according to the present invention is preferably 1.25 to 1.70. In the case where the geometric standard deviation ($\sigma_D$) of distribution for the tube outer diameters of the carbon nanotubes is less than 1.25 and the fiber diameters of the carbon nanotubes have a sharp distribution, the fibers are closely entangled with each other, so that it may be difficult to well disperse the carbon nanotubes in the dispersion. On the other hand, when the geometric standard deviation ($\sigma_D$) of distribution for the tube outer diameters of the carbon nanotubes is more than 1.70 and the fiber diameters of the carbon nanotubes have a broad distribution, the abundance ratio of the fibers having a large fiber diameter tends to be excessively large, so that the resulting carbon nanotubes tend to fail to exhibit sufficient electrical conductivity. From the standpoint of good dispersibility and electrical conductivity, the geometric standard deviation ($\sigma_D$) of distribution for the tube outer diameters of the carbon nanotubes is more preferably 1.4 to 1.6.

In the carbon nanotubes according to the present invention, the product of the ratio of a temperature ($T_{DTA}$) at a first exothermic peak in differential thermal analysis to a crystallite size (Lc(002)) of a (002) plane of the carbon nanotubes in X-ray diffraction analysis, and the geometric standard deviation ($\sigma_D$) of distribution for the tube outer diameters (($T_{DTA}$/Lc(002))×$\sigma_D$) is preferably not more than 22. In the present invention, as a result of intense and earnest study, it has been found that the aforementioned values have a large influence on breakability of the carbon nanotubes. In the differential thermal analysis of the carbon nanotubes, at a temperature indicating the first exothermic peak, there occurs decomposition of the carbon nanotubes. Therefore, it is considered that as the first exothermic peak temperature in the differential thermal analysis of the carbon nanotubes is reduced, the carbon nanotubes, which has lower temperatures of the first exothermic peak, are more readily decomposed. It is considered that this is because the carbon nanotubes according to the present invention have narrowed portions that have a lot of non-continuous crystal portions. Thus, the resulting carbon nanotubes are rendered readily decomposable. Since the likelihood of decomposition of the carbon nanotubes is influenced by crystallinity and fiber diameter of the carbon nanotubes, in the present invention, the product of the ratio of the exothermic peak temperature in differential thermal analysis to the crystallite size of a (002) plane of the carbon nanotubes in X-ray diffraction analysis, and the geometric standard deviation of distribution for the tube outer diameters is used as an index of breakability of the carbon nanotubes. When the product of the ratio of the exothermic peak temperature in differential thermal analysis to the crystallite size of a (002) plane of the carbon nanotubes in X-ray diffraction analysis, and the geometric standard deviation of distribution for the tube outer diameters is more than 22, the amount of the non-continuous crystal portions in the carbon nanotubes tends to be reduced. Thus, the resulting carbon nanotubes tend to be hardly cut and therefore become hardly dispersible. In order to attain higher dispersibility, the product of the ratio of the exothermic peak temperature in differential thermal analysis to the crystallite size of a (002) plane of the carbon nanotubes in X-ray diffraction analysis, and the geometric standard deviation of distribution for the tube outer diameters is more preferably not more than 20.

The water vapor adsorption of the carbon nanotubes according to the present invention is preferably not less than 0.6 mg/g and not more than 4.5 mg/g. When the water vapor adsorption of the carbon nanotubes is less than 0.6 mg/g, the carbon nanotubes tend to have poor compatibility with a water-based solvent, and the amount of a functional group on the surface of the respective carbon nanotubes tends to become small. Thus, active points with a dispersant and an active material are reduced, thereby resulting in poor dispersion of the carbon nanotubes. When the water vapor adsorption of the carbon nanotubes is more than 4.5 mg/g, the total amount of Al and Mg included in the carbon nanotubes tends to increase, and the purity of the carbon nanotubes tends to lower. Thus, the carbon nanotubes tend to be inhibited from exhibiting their excellent properties. In view of good balance between dispersibility and the characteristics, the water vapor adsorption of the carbon nanotubes is preferably not less than 1 mg/g and not more than 4 mg/g.

The sum of Al and Mg contents in the carbon nanotubes according to the present invention is preferably not less than 0.5% by weight and not more than 2.0% by weight. When the sum of Al and Mg contents in the carbon nanotubes is less than 0.5% by weight, the water vapor adsorption of the carbon nanotubes tends to be reduced and therefore they tends to be deteriorated in dispersibility in water. On the contrary, when the sum of Al and Mg contents in the carbon nanotubes is more than 2.0% by weight, the purity of the carbon nanotubes tends to lower. Thus, the carbon nanotubes tend to be inhibited from exhibiting their excellent properties. In view of good balance between the dispersibility and characteristics, the sum of contents of Al and Mg in the carbon nanotubes is more preferably not less than 0.8% by weight and not more than 1.5% by weight.

In addition, the ratio of an Al content to a Mg content in the carbon nanotubes according to the present invention (Al/Mg) is preferably 0.1 to 15. When the ratio of the Al content to the Mg content in the carbon nanotubes is less than 0.1 or more than 15.0, the water vapor adsorption of the carbon nanotubes tends to be reduced. Thus, it may be difficult to disperse the carbon nanotubes in water. In order to attain higher dispersibility of the carbon nanotubes, the ratio of the Al content to the Mg content in the carbon nanotubes (Al/Mg) is more preferably 0.5 to 10.

With respect to the sum of Al and Mg contents of the carbon nanotubes, as the sum of the Al and Mg contents increases, the water vapor adsorption of the carbon nanotubes tends to increases. However, in the case where the sum of the Al and Mg contents of the carbon nanotubes increases, the purity of the carbon nanotubes tends to lower. Thus, the carbon nanotubes tend to be inhibited from exhibiting their inherent characteristics. In the present invention, by controlling the ratio of Al/Mg in the carbon nanotubes to an adequate value, it is possible to attain a much larger water vapor adsorption of the carbon nanotubes even when the sum of the Al and Mg contents of the carbon nanotubes is the same. According to the present invention, by increasing the water vapor adsorption of the carbon nanotubes, dispersibility of the carbon nanotubes in water can be enhanced.

Next, the process for producing the carbon nanotubes according to the present invention is described.

Examples of the raw material gas used for producing the carbon nanotubes according to the present invention include hydrocarbon gas such as propane gas, LPG, LNG, city gas, and pure methane gas, as well as CO gas, etc. The raw material gas is not particularly limited as long as it is capable of producing the carbon nanotubes by chemical vapor phase epitaxy or chemical vapor deposition (CVD) method using a catalyst. In addition, it is also not particularly limited although times are taken to adopt a method to prevent deactivation of the catalyst by mixing the raw material of hydrogen and/or inert gases.

Examples of the catalyst used for producing the carbon nanotubes according to the present invention include those catalysts comprising at least one element selected from the group consisting of Fe, Co, Ni and Mn, and Al and Mg. The examples, more specifically, include metal compounds such as oxides of these selected metal elements, metal-supporting materials and/or metal compound-supporting materials, and simple physical mixtures thereof. The Al and Mg compounds act as a co-catalyst during production of the carbon nanotubes. The sum of Al and Mg contents of the catalyst may be not less than 1% by weight, and preferably 3 to 40% by weight. When the sum of Al and Mg contents of the catalyst is more than 40% by weight, the amount of the co-catalyst tends to be excessively large, so that the production efficiency of the carbon nanotubes tends to be deteriorated.

The use of the catalyst in which the ratio of the Al content to the Mg content (Al/Mg) lies within the range of 0.1 to 15.0 is preferred to produce the carbon nanotubes according to the present invention. Since Al and Mg which are present in the catalyst also remain in the resulting carbon nanotubes, in order to obtain the carbon nanotubes comprising Al and Mg at desired ratios, it is preferred that the ratio of the Al content to the Mg content in the catalyst is previously adjusted.

Examples of the apparatus used for production of the carbon nanotubes include a fluidized bed reactor, a fixed bed reactor, a dropping-type reactor, a twin-screw-type reactor, a rotary kiln, etc. These apparatuses may be selectively used without any particular limitation to a structure and a principle thereof as long as the carbon nanotubes can be produced through the catalyst. Also, the apparatus selectively used for production of the carbon nanotubes may be of a batch type, a continuous type, a batch continuous type, etc., though it is not particularly limited thereto.

The temperature used upon production of the carbon nanotubes is also not particularly limited, and the carbon nanotubes are usually produced at a temperature of 400 to 800° C. Since the decomposability and reactivity of the raw material gas used vary depending upon the kind thereof, various optimum temperatures may be present as the temperature used upon production of the carbon nanotubes according to the kinds of the raw materials gases used. For example, as propane gas a higher reactivity than methane gas, it is possible to produce the carbon nanotubes by using propane gas at a low temperature. The temperature used upon production of the carbon nanotubes when using the methane gas is 550 to 800° C. and preferably 600 to 750° C. Also, the temperature used upon production of the carbon nanotubes when using the propane gas is 400 to 700° C. and preferably 450 to 650° C. The reduction of the temperature used upon production of the carbon nanotubes leads to the reduction of the production velocity of the carbon nanotubes. Besides when the temperature is excessively low, the obtained carbon nanotubes tend to be deteriorated in crystallinity. When the temperature is excessively high, the production velocity of the carbon nanotubes tends to increase and there tends to occur deactivation of the catalyst.

The amount of the catalyst fed upon production of the carbon nanotubes is adjusted as follows. For example, when using a continuous-type rotary kiln having a diameter of 250 mm, the catalyst is continuously fed thereto at a rate of 0.05 to 10 g/min to thereby produce the carbon nanotubes.

The amount of the gas fed upon production of the carbon nanotubes may be in the range of 5 to 40 L/min, for example, when using a continuous-type rotary kiln having a diameter of 250 mm. As a gas charging, there may be used a multi-stage charging method.

In the process for producing the carbon nanotubes according to the present invention, the catalytic reaction is conducted under such a condition that the production velocity of the carbon nanotubes is not more than 0.30 g/min per 1 g of the catalyst. The production velocity of the carbon nanotubes may be controlled by various conditions such as reaction temperature, flow rate of the raw material gas and dilution of the raw material gas with an inert gas or other gasses. The reduction of reaction temperature under a constant rate of the gas flow leads to the reduction of the production velocity of the carbon nanotubes, the reverse is also true. In addition, the reduction of the flow rate of the raw material at a fixed temperature results in the reduction of the production velocity of the carbon nanotubes.

It is considered by the present inventors that the reduction of the production velocity of the carbon nanotubes frequently causes changes of the growth directions toward the direction of the carbon nanotubes axis, so that many narrowed portions as easily-breaking portions having a non-continuous crystal structure are allowed to be present in the obtained carbon nanotubes.

In the present invention, it is considered that the obtained carbon nanotubes are endowed with many narrowed portions as easily-breaking portions having a non-continuous crystal structure. This is because the production velocity of the carbon nanotubes can be reduced owing to a buffering effect against decomposition of the raw material gas when the Al and Mg compounds included in the catalyst acts as a co-catalyst during the utilization of the catalyst comprising Al and Mg, and because the growth directions of the carbon nanotubes frequently change toward the own nanotube directions owning to the blocking of the linear growth which is attributed to the existence of the metal such as Al and Mg to be present in the catalyst.

In addition, in the present invention, the easily-breaking portions are introduced into the carbon nanotubes by reducing the production velocity of the carbon nanotubes, and/or Al, Mg, etc., are incorporated in the carbon nanotubes. This is why the resulting carbon nanotubes exhibit a high water vapor adsorption as well as good compatibility with an aqueous solvent, resulting in facilitated dispersion of the carbon nanotubes in the aqueous solvent. Furthermore, the water vapor adsorption of the carbon nanotubes may be increased by the method of subjecting the carbon nanotubes to air oxidation and/or the method of adding functional groups on the surface of the carbon nanotubes by treating them with an acid or alkali solution.

According to the aforementioned production process of the present invention, the obtained carbon nanotubes have many easily-breaking portions. Thus, even carbon nanotubes not comprising substantially Al and Mg which are obtained by subjecting the above carbon nanotubes to purification treatment for removing the Mg and Al catalyst therefrom can be easily dispersed in solvents. As the purification treatment, there may be used various methods such as a high-temperature heat treatment conducted at a temperature exceeding 2000° C. in an inert gas, acid dissolution, a heat treatment under halogen gas, etc., though not particularly limited thereto. In addition, even in the carbon nanotubes subjected to the purification treatment, the water vapor adsorption of the carbon nanotubes thereof may increase. The high adsorption will be provided by the method of subjecting the carbon nanotubes to air oxidation and/or the method of adding a functional group on the surfaces of the carbon nanotubes where the surfaces are treated with an acid or alkali solution.

In the carbon nanotubes according to the present invention, for example, when the aggregate of the entangled carbon nanotubes is loosen by adding a liquid thereto, the carbon nanotubes are cut at the easily-breaking portions present therein, so that the aggregated structure of the carbon nanotubes is likely to be broken. Moreover, the substance that co-exists in the liquid such as a dispersant comes into contact with the broken aggregate of the carbon nanotubes, so that dispersion of the carbon nanotubes in the liquid can further promotes. Thus, it is possible to readily disperse the carbon nanotubes in the liquid without applying an excessively large mechanical energy thereto for dispersion thereof.

More specifically, the carbon nanotubes according to the present invention can be readily dispersed without applying thereto an excessively large mechanical energy that tends to cause large strain in the crystal and deteriorate excellent properties inherent to the carbon nanotubes. Therefore, the nanotubes can be suitably used as an electrical conductive material for lithium ion secondary batteries.

The carbon nanotubes according to the present invention can be readily dispersed without causing significant damage to their characteristics. Therefore, the nanotubes can be suitably used in various application fields such as composite materials and semiconductor devices, or used as materials for storage battery devices such as capacitors.

The dispersibility of the carbon nanotubes according to the present invention in water is estimated from the ratio between dynamic light-scattering particle diameters (d50) of the carbon nanotubes in the dispersion as measured by the method described in Examples below (dynamic light-scattering particle diameter (d50) with an ultrasonic disperser/ dynamic light-scattering particle diameter (d50) with a stirrer). The value of the ratios lies within the range of 0.50 to 1 and preferably 0.70 to 1.

The resistance of a coating film from the dispersion of the carbon nanotubes according to the present invention is not more than $5.0 \times 10^{-2}$ •·cm and preferably not more than $4.0 \times 10^{-2}$ •·cm, where the measurement method is described in Examples below.

EXAMPLES

The abundance ratio of the easily-breaking portions of the carbon nanotubes was determined as follows. That is, the carbon nanotubes were added to water and dispersed therein for 1 hour using an ultrasonic disperser at a frequency of 38 kHz and an output of 120 W to prepare a 0.1% dispersion of the carbon nanotubes. The thus prepared dispersion was placed and dried on a sample table, and photographed at a magnification of 20,000 times using a transmission microscope "JEM-1200 EXII Model" manufactured by JEOL Ltd. And then, the thus photographed image was observed by naked eyes to calculate the abundance ratio of the easily-breaking portions of the carbon nanotubes. The image was then cut into sections each having an area of 100 nm square according to the scale bar. 300 sections in which a ratio of an area occupied by the carbon nanotubes in each 100 nm-square section was in the range of 10 to 80% were selected. The proportion of the sections in each of which at least one narrowed portion of the carbon nanotubes is present, relative to the 300 sections was defined as the abundance ratio of the easily-breaking portions of the carbon nanotubes.

The geometrical average outer diameters of the carbon nanotubes as well as the geometrical standard deviations of the outer diameters were determined as follows. That is, the carbon nanotubes were added to water and dispersed therein for 1 hour using an ultrasonic disperser at a frequency of 38 kHz and an output of 120 W to prepare a 0.1% dispersion of the carbon nanotubes. The thus prepared dispersion was placed and dried on a sample table, and photographed at a magnification of 20,000 times using a transmission microscope "JEM-1200 EXII Model" manufactured by JEOL Ltd., and then the thus photographed image was analyzed using "A-Zo-Kun" produced by Asahi Kasei Engineering Corporation to measure 500 fiber diameters (tube outer diameters (D)). The geometrical mean outer diameters ($M_D$) and geometrical standard deviations ($\sigma_D$) were determined according to the following formulae.

$$\log M_D = \frac{\sum \log D}{\text{Number of Samples Analyzed}}$$

$$\log M_D = \sqrt{\frac{\sum (\log D)^2 - (\text{Number of Samples Analyzed}) (\log M_D)^2}{(\text{Number of Samples Analyzed}) - 1}}$$

The differential thermal analysis was conducted as follows using a thermogravimetric differential thermal analyzer "TG/DTA6300" manufactured by Seiko Instruments Inc., to evaluate the thermal properties. That is, a sample was placed in an aluminum pan, and the temperature of the sample was varied at a rate of 10° C./min in atmospheric air to determine exothermic and endothermic curves thereof. The exothermic temperature detected at the lowest temperature was regarded as a temperature at which decomposition of the carbon nanotubes was initiated, and defined as an exothermic peak temperature ($T_{DTA}$).

The crystallinity of the carbon nanotubes was determined as follows. That is, the crystallite size of the (002) plane of the carbon nanotubes (Lc(002)) was measured using an X-ray diffraction apparatus "NEW D8 ADVANCE" manufactured by Bruker AXS K.K.

In addition, the initiation temperature of decomposition of the carbon nanotubes was largely influenced by the crystallinity thereof. Thus, evaluation criteria were set such as the values of the exothermic peak temperature determined upon the differential thermal analysis divided by the crystallite size of the (002) plane of the carbon nanotubes as measured in the X-ray diffraction. The values were defined as evaluation ratings of the initiation temperature of decomposition of the carbon nanotubes in view of the crystallinity of the carbon nanotubes.

The water vapor adsorption of a sample was measured as monolayer adsorption of water vapor using "BERSORP-aqua3" manufactured by MicrotracBEL Corporation. Assuming that the monolayer adsorption of water vapor onto the carbon nanotubes was completely finished when a relative pressure $P/P_0$ was 0.3, the monolayer adsorption of water vapor was defined as the water vapor adsorption of the carbon nanotubes.

The measurement of Al and Mg contained in the carbon nanotubes was carried out using a scanning type fluorescent X-ray analyzer "ZSX Primus II" manufactured by Rigaku Corporation.

The dispersibility of the carbon nanotubes in water was determined as follows. That is, 150 g of zirconia beads each having a diameter of 2 mm, 2.5 g of the carbon nanotubes as a sample, and 47.5 g of water as a solvent were charged into a 100 cc polypropylene bottle with a screwed cap. And then, the bottle was shaken for 1 hr using a testing disperser (paint shaker) manufactured by Toyo Seiki Seisaku-Sho, Ltd. Thereafter, the resulting mixture was allowed to pass through a 1 mm-mesh sieve to obtain a dispersion from which the beads were removed. And the dynamic light scattering particle diameter (d50) of the dispersion was measured and evaluated using a dynamic light scattering type particle size distribution measuring apparatus "FPAR1000" Otsuka Electronics Co., Ltd. The dispersed samples to be measured were two: one was prepared by adding 20 parts of water to the above dispersion using stirrer; the other is further the resulting diluted dispersion dispersed for 10 sec using an ultrasonic disperser. The ratio between the dynamic light scattering particle diameters of the two dispersions (ultrasonic wave-dispersed dynamic light scattering particle diameter (d50)/stirrer-dispersed dynamic light scattering particle diameter (d50)) was defined as compatibility with water. As the value of the ratio is reduced, the dilution of the sample using the stirrer tends to be insufficient. The sample tends to be not sufficiently dispersed, and the obtained dispersion had poor compatibility with water. On the other hand, as the the value of the ratio approaches to 1, the sample was sufficiently compatible with water even when applying no ultrasonic wave thereto, and therefore exhibited a sufficiently dispersed condition.

One hundred and fifty grams of zirconia beads each having a diameter of 2 mm, 2.5 g of the carbon nanotubes as a sample, and 47.5 g of water as a solvent were charged into a 100 cc polypropylene bottle with a screwed cap. And then, the bottle was shaken for 1 hr using a testing disperser (paint shaker) manufactured by Toyo Seiki Seisaku-Sho, Ltd. Thereafter, the resulting mixture was allowed to pass through a 1 mm-mesh sieve to obtain a dispersion from which the beads were removed. The dispersing degree of the dispersion was confirmed using an optical microscope "BX51M" and "DP73" manufactured by Olympus Corporation. Using the optical microscope, the surface of a coated film sheet of the carbon nanotubes was observed. Upon the observation, the hardly-dispersible carbon nanotubes showed lump-like behavior, and a large portion thereof was constituted of such a lump-like behavior unit. On the other hand, it was confirmed that well-dispersible carbon nanotubes had an extremely small behavior unit, and showed a field of view having a less unevenness of concentration.

Furthermore, 150 g of zirconia beads each having a diameter of 2 mm, 2.5 g of the carbon nanotubes as a sample and, 47.5 g of water as a solvent were charged into a 100 cc polypropylene bottle with a screwed cap. And then shaken for 1 hr using a testing disperser (paint shaker) manufactured by Toyo Seiki Seisaku-Sho, Ltd. Thereafter, the resulting mixture was allowed to pass through a 1 mm-mesh sieve to obtain a dispersion from which the beads were removed. The dispersing degree of the dispersion was confirmed by observation using a transmission microscope. By observing the carbon nanotubes using a transmission microscope, it is possible to recognize a microscopic dispersing degree of the carbon nanotubes.

The coating film resistance was measured by the following method. That is, 150 g of zirconia beads each having a diameter of 2 mm, 2.5 g of the carbon nanotubes as a sample, and 47.5 g of water as a solvent were charged into a 100 cc polypropylene bottle with a screwed cap. And then shaken for 1 hr using a testing disperser (paint shaker) manufactured by Toyo Seiki Seisaku-Sho, Ltd. Thereafter, the resulting mixture was allowed to pass through a 1 mm-mesh sieve to obtain a dispersion from which the beads were removed. The thus obtained dispersion was applied onto the surface of a corona-treated Toyobo ester film produced by TOYOBO Co., Ltd., using a bar coater No. 4 of a test coater "K Printing Proofer" manufactured by RK Print Coat Instruments Ltd., and then the dispersion was dried. Thereby, a carbon nanotube-coated sheet was obtained. The surface resistance of the thus obtained sheet was measured using a coating film resistance meter of a four-terminal/four-probe type "MCP-PD51 Model" manufactured by Mitsubishi Chemical Analytech Co., Ltd. The film thickness was measured using "ELECTRONIC MICROMETER" manufactured by Anritsu Electric Co., Ltd. The coating film resistance was calculated from the product of the thus measured surface resistance and film thickness.

Using the carbon nanotubes according to the present invention as a conductive material for a negative electrode material, a lithium ion secondary battery was prepared.

Eighty nine parts by mass of lithium nickel cobalt manganate having an average particle diameter of 15 μm ($LiNi_{0.33}Co_{0.33}Mn_{0.33}O_2$) produced by Toda Kogyo Corporation as a positive electrode active material, 6 parts by mass of polyvinylidene fluoride "KF #1320" produced by Kureha Corporation as a binder, and 5 parts by mass of acetylene black "DENKA BLACK" produced by DENKA Co., Ltd., were mixed with each other to prepare a positive electrode mixture. The thus prepared positive electrode mixture was further mixed with N-methyl-2-pyrrolidinone, and the resulting mixture was kneaded together to thereby prepare a paste-like positive electrode mixture slurry. The thus prepared positive electrode mixture slurry was uniformly applied onto one surface of a 30 μm-thick aluminum foil, and then dried and rolled, thereby obtaining a sheet electrode having a coating portion cut into a size of 30 mm in width and 50 mm in length. At this time, the coating amount of the positive electrode mixture per a unit area of the sheet was controlled to 10 mg/cm$^2$ in terms of a mass of the lithium nickel cobalt manganate. A part of the sheet electrode had an exposed aluminum foil portion formed by removing the positive electrode mixture therefrom in the direction perpendicular to a longitudinal direction of the sheet which was integrally connected with a positive electrode current collector (aluminum foil) of the coating portion, and acted as a positive electrode lead plate.

Ninety four parts by mass of an artificial graphite as a negative electrode active material, 2 parts by mass of a styrene-butadiene rubber as a binder, 2 parts by mass of carboxymethyl cellulose as a thickening agent, and 2 parts by mass of a conductive material were mixed with each other to thereby prepare a paste-like negative electrode mixture slurry. As the conductive material, there was used one material selected from the product of the present invention and "VGCF-H" produced by Showa Denko K.K. The thus prepared negative electrode mixture slurry was uniformly applied onto one surface of a 18 ∥m-thick copper foil, and then dried and rolled, thereby obtaining a sheet electrode having a coating portion cut into a size of 32 mm in width and 52 mm in length. At this time, the coating amount of the negative electrode mixture per a unit area of the sheet was controlled to 6 mg/cm$^2$ in terms of a mass of the graphite material. A part of the sheet electrode had an exposed copper foil portion formed by removing the negative electrode mixture therefrom in the direction perpendicular to a longitudinal direction of the sheet which was integrally connected with a negative electrode current collector (copper foil) of the coating portion, and acted as a negative electrode lead plate.

The thus prepared positive electrode and negative electrode were laminated on each other such that the coating portion of the positive electrode was opposed to the coating portion of the negative electrode through a polypropylene microporous film "#2400" produced by Celgard, LLC., and fixed together using a polyimide tape. The thus obtained single-layer electrode body was embedded in an aluminum laminated film, and an electrolyte solution was poured thereinto, and then the laminated film was heat-fused under the condition that the aforementioned positive and negative lead plates were protruded therefrom, thereby preparing a closed-type single-layer laminate battery. As the electrolyte solution, there was used a solution prepared by dissolving 1 mol/L of lithium hexafluorophosphate $LiPF_6$ in a solvent prepared by mixing ethylene carbonate and ethyl methyl carbonate at a volume ratio of 3:7.

The charging operation of the battery was conducted by constant current charging (CC charging) at 0.25 mV until reaching 10 mV, and at the time at which the current was attenuated up to 0.025 mA, the charging operation was regarded as being completed. The discharging operation of the battery was conducted by constant current discharging (CC discharging) at 0.25 mA, and cut-off at 1.5 V. The charging and discharging operations were repeated 300 cycles.

The carbon nanotubes were produced by conducting a chemical vapor deposition (CVD) reaction while feeding a catalyst and a raw material gas to a suitable reactor.

The contents of the respective elements in the catalyst were measured by a scanning type fluorescent X-ray analyzer "ZSX Primus II" manufactured by Rigaku Corporation.

The production velocity of the carbon nanotubes was determined as follows. That is, the raw material gas was fed into a reaction vessel into which a gas sampling nozzle was introduced. An amount of the hydrogen gas, generated with the progress of the reaction of the raw material gas, was continuously measured by gas chromatography until the purity of the carbon nanotubes reached 85% in an in-line manner. The thus measured amount of the hydrogen gas was divided by the amount of the catalyst with which the reactor was charged, to obtain an average value thereof. The purity of the carbon nanotubes was calculated from the amount and flow rate of the hydrogen gas generated and the amount of the catalyst charged which were measured by gas chromatography. In the case of the batch-type reaction, the amount of the hydrogen gas generated until the reaction time at which the purity of the carbon nanotubes reached 85% was measured, whereas in the continuous-type reaction, the sampling nozzle was moved along the major axis direction of the reactor to measure an amount of the hydrogen gas generated at the position at which the purity of the carbon nanotubes was 85%. As the gas chromatography used for the gas analysis, there was used "Agilent 490 Micro-GC" manufactured by GL Sciences Inc.

Example 1

A 10 L-capacity batch rotary kiln was charged with five grams in total of metal oxide particles comprising iron oxide as a main component and also comprising Al and Mg at a ratio of Al/Mg of 0.5 such that a total content of Al and Mg in the metal oxide particles was 25% by weight. By using the metal oxide particles as a catalyst, pure methane as a raw material gas was fed into the rotary kiln at a gas flow rate of 2 L/min and subjected to CVD reaction at 700° C. for 3 hr, thereby obtaining carbon nanotubes.

Example 2

A 10 L-capacity batch rotary kiln was charged with five grams in total of metal oxide particles comprising iron oxide as a main component and also comprising Al and Mg at a ratio of Al/Mg of 0.8 such that a total content of Al and Mg in the metal oxide particles was 15% by weight. By using the metal oxide particles as a catalyst, pure methane as a raw material gas was fed into the rotary kiln at a gas flow rate of 2 L/min and subjected to CVD reaction at 700° C. for 3 hr, thereby obtaining carbon nanotubes.

Example 3

A 10 L-capacity batch rotary kiln was charged with five grams in total of metal oxide particles comprising iron oxide as a main component and also comprising Al and Mg at a ratio of Al/Mg of 0.5 such that a total content of Al and Mg in the metal oxide particles was 25% by weight. By using the metal oxide particles as a catalyst, pure methane as a raw material gas was fed into the rotary kiln at a gas flow rate of 0.8 L/min and subjected to CVD reaction at 700° C. for 3 hr, thereby obtaining carbon nanotubes.

Example 4

A 10 L-capacity batch rotary kiln was charged with five grams in total of metal oxide particles comprising iron oxide as a main component and also comprising Al and Mg at a ratio of Al/Mg of 0.7 such that a total content of Al and Mg in the metal oxide particles was 15% by weight. By using the metal oxide particles as a catalyst, pure methane as a raw material gas was fed into the rotary kiln at a gas flow rate of 2 L/min and subjected to CVD reaction at 700° C. for 3 hr, thereby obtaining carbon nanotubes.

Example 5

A continuous rotary kiln having a diameter of 250 mm was charged with metal oxide particles comprising iron oxide as a main component and also comprising Al and Mg at a ratio of Al/Mg of 0.5 such that a total content of Al and Mg in the metal oxide particles was 25% by weight at a rate of 0.2 g/min. By using the metal oxide particles as a catalyst, pure methane as a raw material gas was fed into the rotary kiln at a gas flow rate of 14 L/min and subjected to CVD reaction at 700° C. for a retention time of 3 hr, thereby obtaining carbon nanotubes.

Example 6

A twin-screw type moving bed reactor having a screw diameter of 74 mm was continuously charged with metal oxide particles comprising iron oxide as a main component and also comprising Al and Mg at a ratio of Al/Mg of 0.5 such that a total content of Al and Mg in the metal oxide particles was 25% by weight at a rate of 0.4 g/min. By using the metal oxide particles as a catalyst, 13 A as a raw material gas was fed into the rotary kiln at a gas flow rate of 13 L/min and subjected to CVD reaction at 700° C. for a retention time of 3 hr, thereby obtaining carbon nanotubes.

Example 7

A 10 L-capacity batch rotary kiln was charged with five grams in total of metal oxide particles comprising iron oxide as a main component and also comprising Al and Mg at a ratio of Al/Mg of 0.5 such that a total content of Al and Mg in the metal oxide particles was 25% by weight. By using the metal oxide particles as a catalyst, LPG as a raw material gas was fed into the rotary kiln at a gas flow rate of 2 L/min and subjected to CVD reaction at 625° C. for 3 hr, thereby obtaining carbon nanotubes.

Example 8

A continuous rotary kiln having a diameter of 250 mm was continuously charged with metal oxide particles comprising iron oxide as a main component and also comprising Al and Mg at a ratio of Al/Mg of 20.0 such that a total content of Al and Mg in the metal oxide particles was 25% by weight. By using the metal oxide particles as a catalyst, pure methane as a raw material gas was fed into the rotary kiln at a gas flow rate of 13 L/min and subjected to CVD reaction at 700° C. for a retention time of 3 hr, thereby obtaining carbon nanotubes. The thus obtained carbon nanotubes were heat-treated with a halogen gas at 1000° C., thereby obtaining high-purity carbon nanotubes.

Example 9

A continuous rotary kiln having a diameter of 250 mm was continuously charged with metal oxide particles comprising iron oxide as a main component and also comprising Al and Mg at a ratio of Al/Mg of 20.0 such that a total content of Al and Mg in the metal oxide particles was 25% by weight at a rate of 0.2 g/min. By using the metal oxide particles as a catalyst, pure methane as a raw material gas was fed into the rotary kiln at a gas flow rate of 13 L/min and subjected to CVD reaction at 700° C. for a retention time of 3 hr, thereby obtaining carbon nanotubes. The thus obtained carbon nanotubes were heat-treated with a halogen gas at 1000° C., and then subjected to oxidation treatment at 400° C. in atmospheric air.

Example 10

A 10 L-capacity batch rotary kiln was charged with three grams in total of metal oxide particles comprising iron oxide as a main component and also comprising Al and Mg at a ratio of Al/Mg of 8.0 such that a total content of Al and Mg in the metal oxide particles was 5% by weight. By using the metal oxide particles as a catalyst, pure methane as a raw material gas was fed into the rotary kiln at a gas flow rate of 2 L/min and subjected to CVD reaction at 700° C. for 3 hr, thereby obtaining carbon nanotubes.

Comparative Example 1

A 10 L-capacity batch rotary kiln was charged with five grams in total of metal oxide particles comprising iron oxide as a main component and also comprising Al and Mg at a ratio of Al/Mg of 0.5 such that a total content of Al and Mg in the metal oxide particles was 25% by weight. By using the metal oxide particles as a catalyst, LPG as a raw material gas was fed into the rotary kiln at a gas flow rate of 2 L/min and subjected to CVD reaction at 700° C. for 3 hr, thereby obtaining carbon nanotubes.

Comparative Example 2

A 10 L-capacity batch rotary kiln was charged with five grams in total of metal oxide particles comprising iron oxide as a main component and also comprising Al and Mg at a ratio of Al/Mg of 0.5 such that a total content of Al and Mg in the metal oxide particles was 25% by weight. By using the metal oxide particles as a catalyst, LPG as a raw material gas was fed into the rotary kiln at a gas flow rate of 2 L/min and subjected to CVD reaction at 650° C. for 3 hr, thereby obtaining carbon nanotubes.

Comparative Example 3

Carbon nanotubes "AMC" produced by UBE INDUSTRIES, LTD.

Comparative Example 4

Carbon nanotubes "NC7000" produced by Nanocyl s. a.

Comparative Example 5

Carbon nanotubes "FloTube9000" produced by CNano Technology Limited.

The carbon nanotubes obtained in Examples 1 to 10 and Comparative Examples 1 to 5 as well as properties of the carbon nanotubes are shown in Table 1.

TABLE 1

| Examples and Comp. Examples | Reaction temperature ° C | Production velocity g/min | Abundance ratio of easily-breaking portions % | Number-average diameter of tube outer diameter nm |
|---|---|---|---|---|
| Example 1 | 700 | 0.19 | 92 | 16.3 |
| Example 2 | 700 | 0.19 | 76 | 15.9 |
| Example 3 | 700 | 0.10 | 94 | 17.9 |
| Example 4 | 700 | 0.07 | 96 | 13.0 |
| Example 5 | 700 | 0.14 | 83 | 15.4 |
| Example 6 | 700 | 0.25 | 64 | 16.2 |
| Example 7 | 625 | 0.28 | 74 | 10.0 |
| Example 8 | 700 | 0.14 | 86 | 17.1 |
| Example 9 | 700 | 0.14 | 84 | 17.8 |
| Example 10 | 700 | 0.20 | 78 | 16.4 |
| Comp. Example 1 | 700 | 0.42 | 51 | 15.8 |
| Comp. Example 2 | 650 | 0.34 | 54 | 11.4 |
| Comp. Example 3 | — | — | 51 | 10.5 |
| Comp. Example 4 | — | — | 23 | 11.4 |
| Comp. Example 5 | — | — | 19 | 12.5 |

| Examples and Comp. Examples | Geometric standard deviation of distribution of tube outer ($\sigma_D$) — | Crystallite diameter of 002 plane ($L_c 002$) Å | Water vapor adsorption mg/g | Ultrasonic wave-dispersed dynamic light scattering particle diameter (d50)/stirrer-dispersed dynamic light scattering particle diameter (d50) — |
|---|---|---|---|---|
| Ex. 1 | 1.47 | 47 | 3.69 | 0.89 |
| Ex. 2 | 1.51 | 42 | 2.30 | 0.92 |
| Ex. 3 | 1.62 | 53 | 3.50 | 0.81 |
| Ex. 4 | 1.28 | 35 | 1.17 | 0.66 |
| Ex. 5 | 1.45 | 45 | 3.50 | 0.85 |
| Ex. 6 | 1.47 | 44 | 3.88 | 0.87 |
| Ex. 7 | 1.30 | 37 | 3.20 | 0.70 |
| Ex. 8 | 1.37 | 46 | 0.13 | 0.65 |
| Ex. 9 | 1.37 | 45 | 0.75 | 0.86 |
| Ex. 10 | 1.36 | 46 | 0.50 | 0.80 |
| Comp. Ex. 1 | 1.50 | 40 | 2.40 | 0.88 |
| Comp. Ex. 2 | 1.38 | 38 | 2.50 | 0.75 |
| Comp. Ex. 3 | 1.23 | 26 | 0.47 | 0.41 |
| Comp. Ex. 4 | 1.29 | 28 | 4.73 | 0.69 |
| Comp. Ex. 5 | 1.35 | 32 | 0.87 | 0.70 |

| Examples and Comp. Examples | In CNT Total content of Al and Mg wt % | Al/Mg — | First exothermic peak temperature in differential thermal analysis ($T_{DTA}$) ° C |
|---|---|---|---|
| Example 1 | 1.66 | 0.5 | 570 |
| Example 2 | 0.59 | 0.8 | 585 |
| Example 3 | 1.66 | 0.5 | 600 |
| Example 4 | 0.80 | 10.7 | 575 |
| Example 5 | 1.66 | 0.5 | 560 |
| Example 6 | 1.66 | 0.5 | 600 |

TABLE 1-continued

| Example 7 | 1.66 | 0.5 | 600 |
| --- | --- | --- | --- |
| Example 8 | 0.002 | 20.0 | 730 |
| Example 9 | 0.002 | 20.0 | 725 |
| Example 10 | 0.40 | 8.0 | 545 |
| Comp. Example 1 | 1.66 | 0.5 | 615 |
| Comp. Example 2 | 1.66 | 0.5 | 615 |
| Comp. Example 3 | 0.28 | 0.01 | 525 |
| Comp. Example 4 | 4.12 | 1373.3 | 570 |
| Comp. Example 5 | 0.79 | 16.4 | 635 |

| Examples and Comp. Examples | $(T_{DTA}/L_c(002)) \times \sigma_D$ | Coating film resistance of water dispersion $\times 10^{-2}$ $\Omega \cdot$ cm |
| --- | --- | --- |
| Example 1 | 17.9 | 2.8 |
| Example 2 | 21.1 | 3.1 |
| Example 3 | 18.2 | 2.2 |
| Example 4 | 20.8 | 2.2 |
| Example 5 | 18.0 | 3.0 |
| Example 6 | 20.2 | 2.4 |
| Example 7 | 21.4 | 3.3 |
| Example 8 | 21.8 | 3.6 |
| Example 9 | 21.9 | 2.3 |
| Example 10 | 16.1 | 4.4 |
| Comp. Example 1 | 22.8 | 7.6 |
| Comp. Example 2 | 22.6 | 6.1 |
| Comp. Example 3 | 24.6 | 2.9 |
| Comp. Example 4 | 26.7 | — |
| Comp. Example 5 | 27.1 | — |

Figure 6:
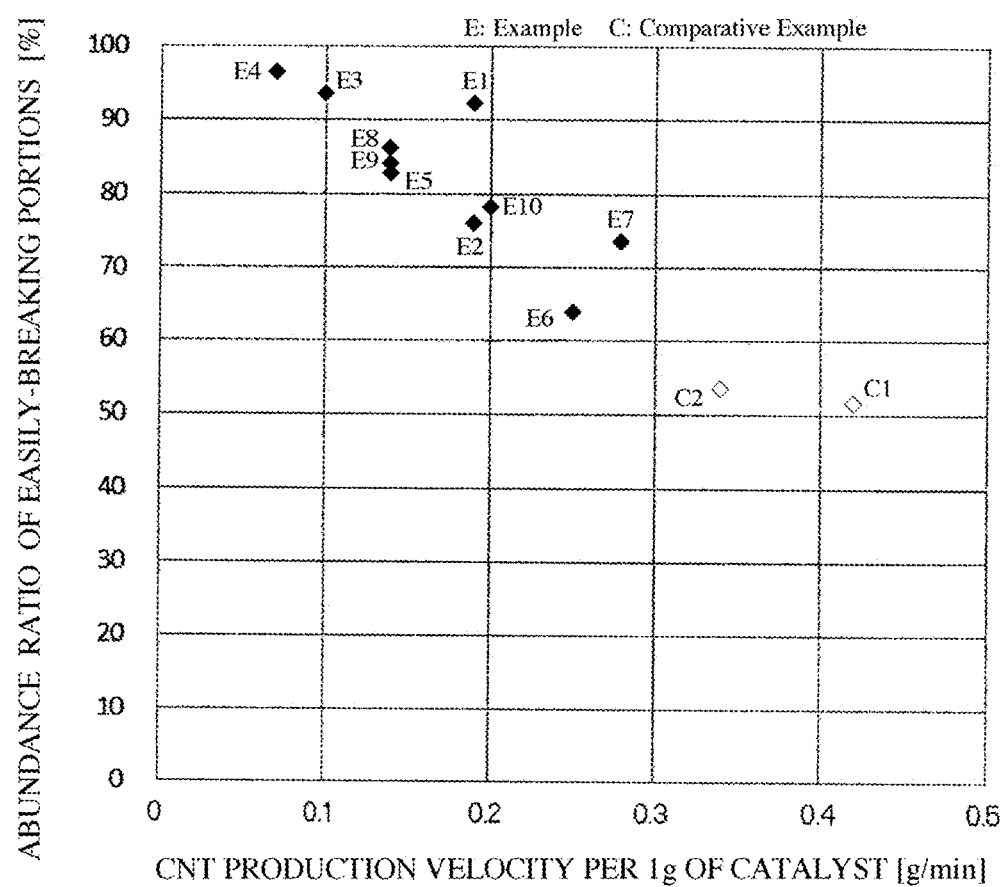
FIG. 6 is a graphic view showing a relationship between a production velocity of the carbon nanotubes and an abundance ratio of easily-breaking portions in the carbon nanotubes.
Figure 7:
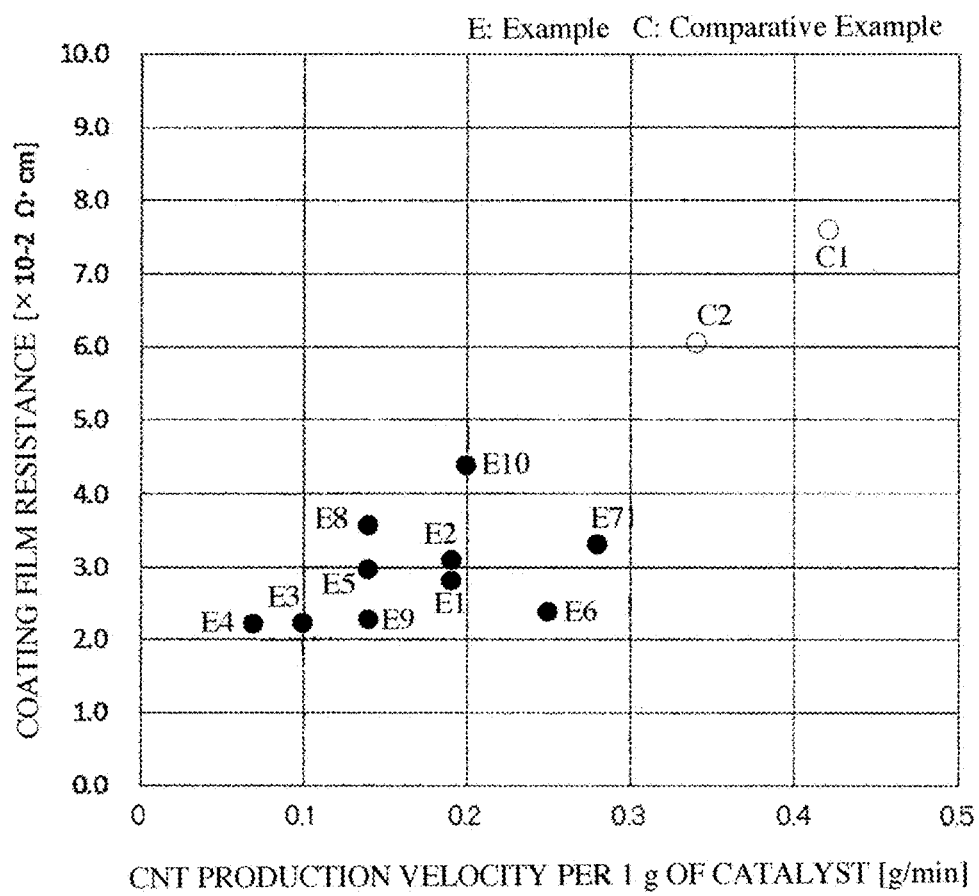
FIG. 7 is a graphic view showing a relationship between a production velocity of the carbon nanotubes and a resistance of the coating film thereof.

As typical examples of the carbon nanotubes, in FIGS. 2 to 5, there are shown transmission electron micrographs of the carbon nanotubes obtained in Examples 1 and 4 and Comparative Examples 3 and 4. FIGS. 6 and 7 show a relationship between the production velocity of the carbon nanotubes and the abundance ratio of the easily-breaking portions as well as a relationship between the production velocity of the carbon nanotubes and the coating film resistance.

The wall portions of the carbon nanotubes obtained in Examples were provided thereof with a non-continuous crystal structure as compared to those obtained in Comparative Examples. As the production velocity of the carbon nanotubes is reduced, the proportion of the non-continuous crystal portions is increased. The coating film resistance of the carbon nanotubes becomes good in association therewith.

In Comparative Examples 1 and 2, since the carbon nanotubes were produced using LPG mainly comprising propane having high reactivity as the raw material gas, the production velocity of the carbon nanotubes was increased. For this reason, the abundance ratio of the easily-breaking portions in the carbon nanotubes is reduced. Thus, the dispersion of the carbon nanotubes was deteriorated in dispersibility, and exhibited high coating film resistance. Even when using a gas having high reactivity, by reducing the reaction temperature as in Example 7, reducing the gas flow rate, or reducing the production velocity of the carbon nanotubes by dilution of the gas, it is possible to enhance the abundance ratio of the easily-breaking portions in the carbon nanotubes.

Figure 8:
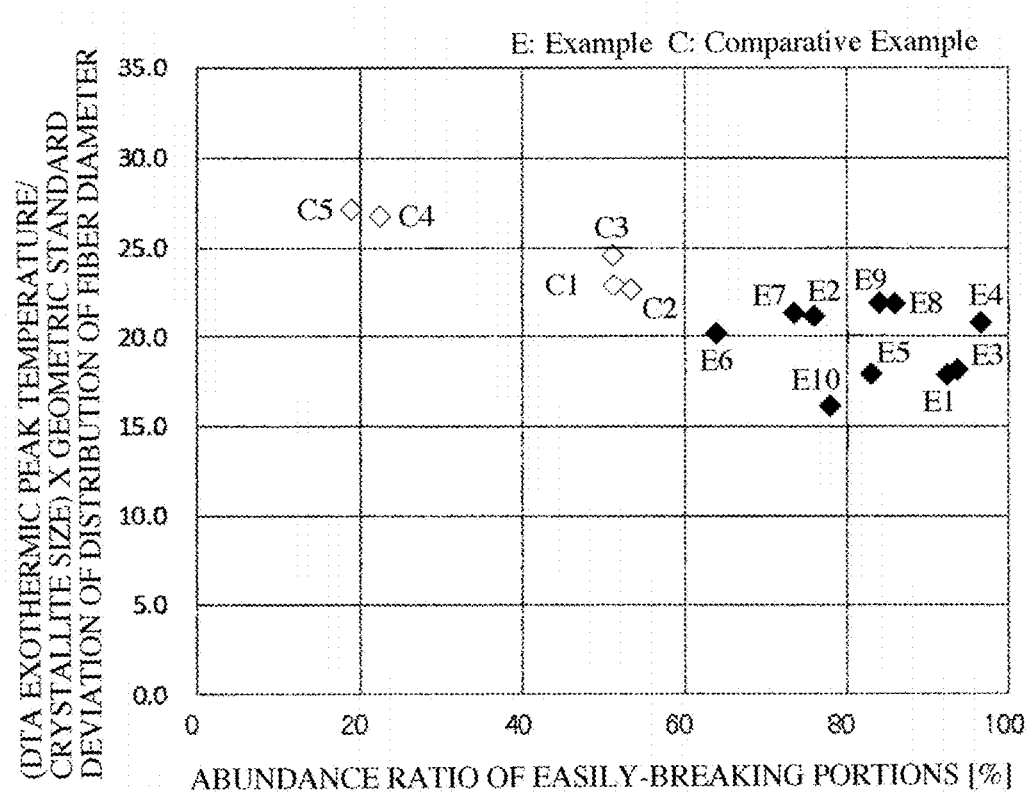
FIG. 8 is a graphic view showing a relationship between an exothermic peak in differential thermal analysis of the carbon nanotubes and an abundance ratio of easily-breaking portions in the carbon nanotubes.

In FIG. 8, there is shown a relationship between the abundance ratio of the easily-breaking portions in the carbon nanotubes and the product of the ratio of the exothermic peak temperature in differential thermal analysis to the crystallite size of a (002) plane of the carbon nanotubes in X-ray diffraction analysis, and the geometric standard deviation of distribution of the fiber diameter of the carbon nanotubes. These characteristics of the carbon nanotubes had a good correlation with each other, and as the product of the ratio of the exothermic peak temperature in differential thermal analysis to the crystallite size of a (002) plane of the carbon nanotubes in X-ray diffraction analysis, and the geometric standard deviation of distribution of the fiber diameter of the carbon nanotubes was reduced, the resulting carbon nanotubes were easily dispersed in water, and the obtained dispersion had a reduced coating film resistance when formed into a coating film.

Figure 9:
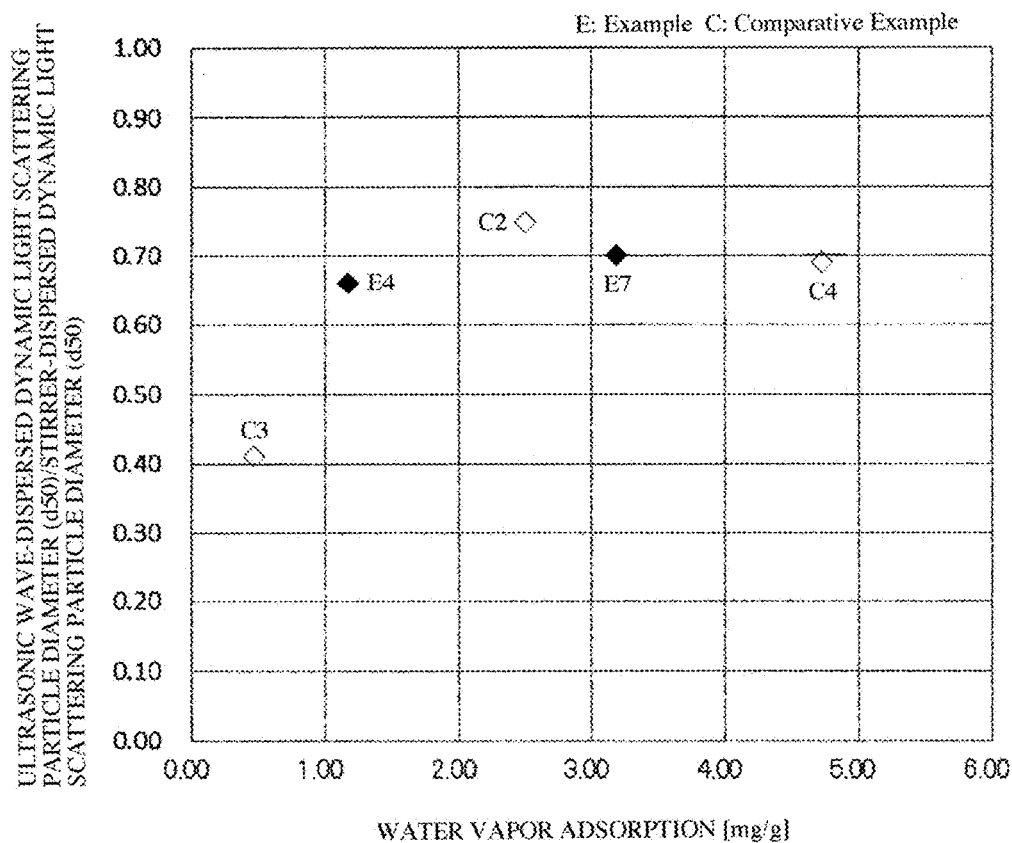
FIG. 9 is a graphic view showing a relationship between a water vapor adsorption of the carbon nanotubes and a dispersibility thereof.

In FIG. 9, there is shown a relationship between the water vapor adsorption of the carbon nanotubes having a tube outer diameter of 10 to 13 nm and the ratio of (ultrasonic wave-dispersed dynamic light scattering particle diameter (d50)/stirrer-dispersed dynamic light scattering particle diameter (d50)). When the water vapor adsorption of the carbon nanotubes was reduced, the ratio of (ultrasonic wave-dispersed dynamic light scattering particle diameter (d50)/stirrer-dispersed dynamic light scattering particle diameter (d50)) was also reduced. That is, comparatively, the dispersion of the carbon nanotubes in water as the solvent became insufficient and the carbon nanotubes resulted in poor compatibility with water. In Comparative Example 2, the obtained carbon nanotubes had good compatibility with water, but were deteriorated in dispersibility owing to the less abundance ratio of the easily-breaking portions in the carbon nanotubes.

Figure 10:
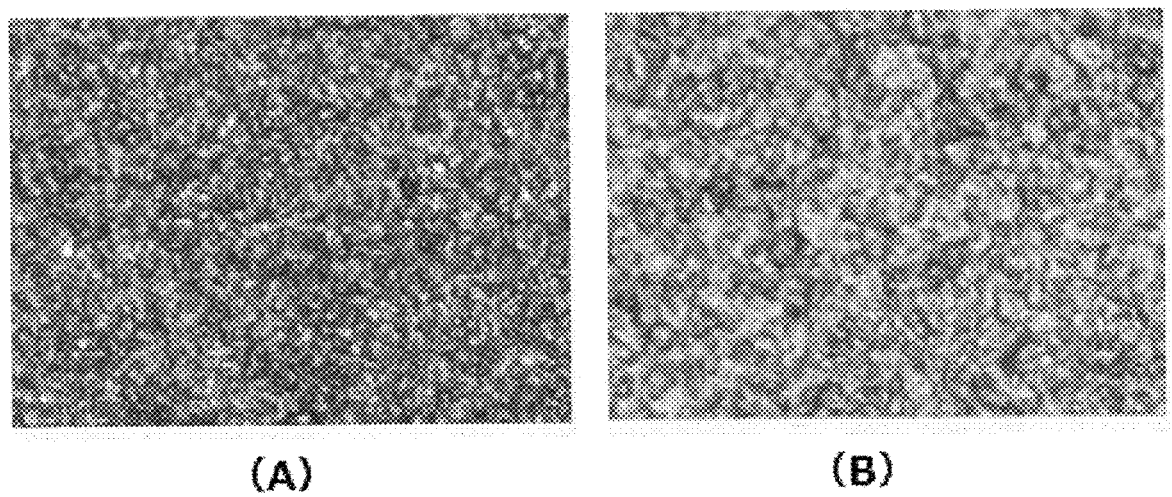
FIG. 10 is optical micrographs showing coating films of the carbon nanotubes obtained in Example 1 (A) and Comparative Example 3 (B), respectively.

In FIG. 10, there are shown optical micrographs of coating films comprising the carbon nanotubes obtained in Example 1 and Comparative Example 3. In the micrograph of Comparative Example 3, the constitutional units of the carbon nanotubes were large, and therefore unevenness of dispersion of the carbon nanotubes was recognized. From Table 1, it was confirmed that the coating film resistance of the carbon nanotubes obtained in Comparative Example 3 was low. However, the low resistance was caused by the thin fiber diameter of the carbon nanotubes, and when actually observing the coating film, it was confirmed that the carbon nanotubes were insufficient in dispersibility.

Figure 11:
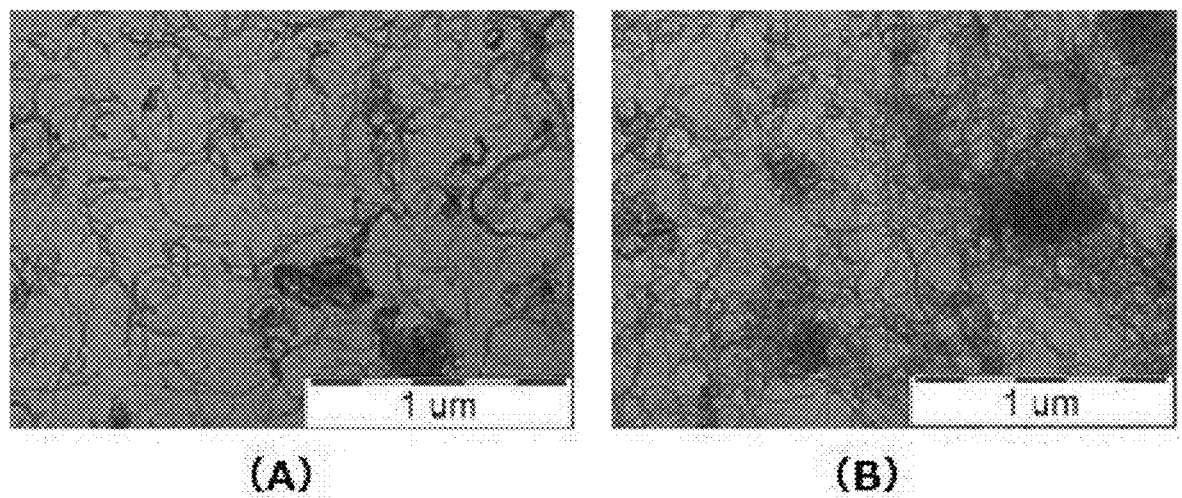
FIG. 11 is transmission electron micrographs showing dispersions of the carbon nanotubes obtained in Example 4 (A) and Comparative Example 3 (B), respectively.

In FIG. 11, there are shown transmission micrographs of the carbon nanotubes obtained in Example 4 and Comparative Example 3. Although both of the carbon nanotubes had a thin fiber diameter, the carbon nanotubes obtained in Example 4 had a shorter fiber length and were dispersed in a more suitable manner. This was largely caused by the abundance ratio of the easily-breaking portions in the carbon nanotubes. By using the carbon nanotubes obtained in Comparative Examples 4 and 5 which were similar to those in Example 4 but showed a small abundance ratio of the easily-breaking portions as compared to those in Example 4, was not possible to form a coating film therefrom.

Figure 12:
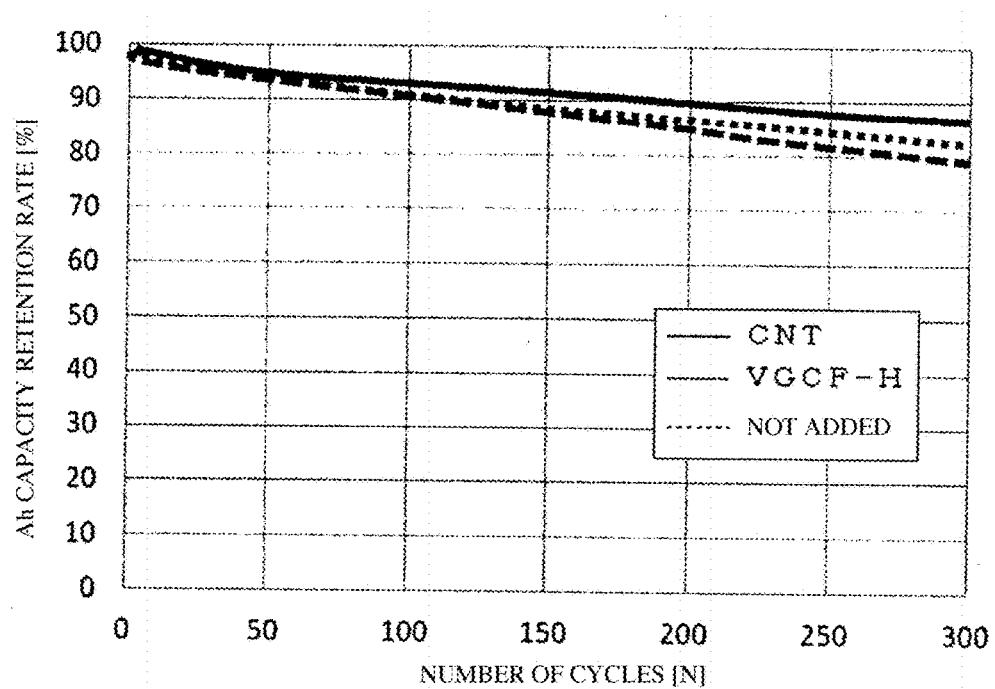
FIG. 12 is a graphic view showing cycle characteristics of a lithium secondary battery in the case where the carbon nanotubes obtained in Example 1 were applied to an active material for a negative electrode of the battery.

FIG. 12 shows cycle characteristics of a lithium ion secondary battery as a function of cycle numbers in the case where the aqueous dispersion of the carbon nanotubes obtained in Example 1 was used as a conductive material on a negative electrode side thereof. For a comparative purpose, there are also shown the results in the case where no conductive materials were used and in the case where carbon nanofibers "VGCF-H" (fiber diameter: 130 nm) produced by Showa Denko K.K. were used as the conductive material. The carbon nanotubes according to the present invention showed extremely excellent values for the cycle characteristics. This was because it was not necessary to apply excessively large energy thereto in order to disperse the carbon nanotubes. Namely, the carbon nanotubes were sufficiently dispersed without causing distortion in crystals. In addition, the improvement in the cycle characteristics was also attained by the sufficiently small fiber diameter of the carbon nanotubes as compared to that of the carbon nanofibers "VGCF-H". Thus, the carbon nanotubes according to the present invention can be suitably used as a conductive material for lithium ion secondary batteries.

INDUSTRIAL APPLICABILITY

The carbon nanotubes according to the present invention can be readily cut owing to a narrowed portion provided on a wall of the carbon nanotubes. And the carbon nanotubes can also be readily dispersed without applying an excessively large mechanical energy thereto irrespective of a thin fiber diameter thereof. Therefore, the carbon nanotubes according to the present invention can be suitably used in various applications such as composite materials and semiconductor devices, or as materials for storage battery devices.

EXPLANATION OF REFERENCE NUMERALS

1: Parallel portion
2: Tube outer diameter of parallel portion
3: Narrowed portion
4: Tube outer diameter of narrowed portion

The invention claimed is:

1. Carbon nanotubes each comprising a wall that comprises a parallel portion and a narrowed portion having a tube outer diameter that is not more than 90% of a tube outer diameter of the parallel portion,
in which when preparing a 0.1% dispersion of the carbon nanotubes, drying the dispersion on a sample table, photographing the thus dried carbon nanotubes at a magnification of 20,000 times using a transmission electron microscope to obtain a micrograph of the carbon nanotubes, dividing the micrograph into sections each having an area of 100 nm square, and selecting 300 sections each having a carbon nanotube occupied area ratio of 10 to 80%, a proportion of the sections in each of which at least one narrowed portion is present is not less than 70% among the 300 sections.

2. The carbon nanotubes according to claim 1, wherein a geometric mean diameter ($M_D$) of the tube outer diameter (D) of the carbon nanotubes is 5 to 30 nm.

3. The carbon nanotubes according to claim 1, wherein a geometric standard deviation ($\sigma_D$) of distribution of the tube outer diameter of the carbon nanotubes is 1.25 to 1.70.

4. The carbon nanotubes according to claim 1, wherein a product of a ratio of an exothermic peak temperature ($T_{DTA}$) in differential thermal analysis to a crystallite size (Lc(002)) of a (002) plane of the carbon nanotubes in X-ray diffraction analysis, and the geometric standard deviation ($\sigma_D$) of distribution of the tube outer diameter ($T_{DTA}$/Lc(002))×$\sigma_D$) is not more than 22.

5. The carbon nanotubes according to claim 1, wherein a water vapor adsorption of the carbon nanotubes is not less than 0.6 mg/g.

6. The carbon nanotubes according to claim 1, wherein a total content of Al and Mg in the carbon nanotubes is 0.5 to 2.0% by weight, and a ratio of a content of Al to a content of Mg in the carbon nanotubes (Al/Mg) is 0.1 to 15.0.

7. A process for producing the carbon nanotubes as claimed in claim 1, in which the carbon nanotubes are produced by chemical vapor deposition reaction using a hydrocarbon gas as a raw material gas, and by using a catalyst comprising at least one element selected from the group consisting of Fe, Co, Ni and Mn, Al and Mg, a production velocity of the carbon nanotubes is controlled to not more than 0.30 g/min per 1 g of the catalyst.

8. A lithium ion secondary battery comprising a negative electrode comprising the carbon nanotubes according to claim 1.

* * * * *